(12) United States Patent
Fischer

(10) Patent No.: US 10,318,245 B2
(45) Date of Patent: *Jun. 11, 2019

(54) DEVICE AND METHOD FOR DETERMINING AN INVERSE OF A VALUE RELATED TO A MODULUS

(75) Inventor: Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 778 days.

This patent is subject to a terminal disclaimer.

(21) Appl. No.: 13/483,496

(22) Filed: May 30, 2012

(65) Prior Publication Data

US 2012/0237025 A1    Sep. 20, 2012

Related U.S. Application Data

(63) Continuation of application No. 11/871,314, filed on Oct. 12, 2007, now Pat. No. 8,290,151.

(51) Int. Cl.
*H04L 9/00* (2006.01)
*G06F 7/72* (2006.01)

(52) U.S. Cl.
CPC .................. *G06F 7/721* (2013.01)

(58) Field of Classification Search
CPC ........................................................ H04L 9/00
USPC .................. 380/44–47, 28–30; 708/490–492
See application file for complete search history.

(56) References Cited

U.S. PATENT DOCUMENTS

| | | | |
|---|---|---|---|
| 6,304,658 B1 | 10/2001 | Kocher et al. | |
| 6,370,671 B1 | 4/2002 | Pan et al. | |
| 6,792,108 B1 | 9/2004 | Patera et al. | |
| 7,191,333 B1 | 3/2007 | Maddury et al. | |
| 7,318,145 B1 * | 1/2008 | Stribaek | G06F 9/30072 712/219 |
| 7,580,966 B2 | 8/2009 | Le Quere | |
| 7,672,990 B2 | 3/2010 | Dupaquis et al. | |
| 7,995,752 B2 | 8/2011 | Lambert et al. | |
| 2002/0136401 A1 | 9/2002 | Hoffstein et al. | |
| 2003/0031316 A1 | 2/2003 | Langston et al. | |
| 2003/0091185 A1 | 5/2003 | Swindlehurst et al. | |
| 2003/0123654 A1 * | 7/2003 | Lambert | 380/28 |
| 2003/0147529 A1 | 8/2003 | Perkins | |
| 2003/0223580 A1 * | 12/2003 | Snell | H04L 9/003 380/28 |
| 2003/0235299 A1 | 12/2003 | Dupaquis | 380/30 |
| 2004/0158597 A1 | 8/2004 | Ye et al. | 708/492 |
| 2009/0097637 A1 * | 4/2009 | Boscher | G06F 7/723 380/28 |

(Continued)

FOREIGN PATENT DOCUMENTS

| | | |
|---|---|---|
| DE | 10-222212 | 12/2003 |
| DE | 10 2005 030 286 A1 | 1/2007 |

OTHER PUBLICATIONS

Adnan Abdul-Aziz Gutub, et al.; "Scalable VLSI Architecture for GF(p) Montgomery Modular Inverse Computation"; Proceedings of the IEEE Computer Society Annual Symposium on VLSI, 2002.

*Primary Examiner* — Josnel Jeudy

(74) *Attorney, Agent, or Firm* — Schiff Hardin LLP

(57) ABSTRACT

A device for determining an inverse of an initial value related to a modulus, comprising a unit configured to process an iterative algorithm in a plurality of iterations, wherein an iteration includes two modular reductions and has, as an iteration loop result, values obtained by an iteration loop of an extended Euclidean algorithm.

25 Claims, 5 Drawing Sheets

(56) References Cited

U.S. PATENT DOCUMENTS

2010/0027788 A1    2/2010   Tkacik et al.
2012/0057695 A1*   3/2012   Lazich et al. .................. 380/28

* cited by examiner

DEVICE AND METHOD FOR DETERMINING AN INVERSE OF A VALUE RELATED TO A MODULUS

CROSS-REFERENCE TO RELATED APPLICATIONS

This Application is a Continuation of U.S. application Ser. No. 11/871,314, filed on Oct. 12, 2007.

BACKGROUND OF THE INVENTION

The present invention relates to cryptographic algorithms and, in particular, to algorithms for determining an inverse of a value related to a modulus.

Computations of inverses, in particular, a computation of the modular multiplicative inverse $Z_0^{-1} \bmod N_0$, wherein $Z_0$ and $N_0$ are two non-negative integers with $\gcd(Z_0, N_0)=1$ (gcd=greatest common divisor) are e.g. an important component when determining cryptographic keys. They are needed e.g. when determining cryptographic keys for the RSA-algorithm (named after Ron Rivest, Adi Shamir and Leonard Adleman) or other cryptographic algorithms as e.g. the ECDSA-algorithm (ECDSA=Elliptic Curve Digital Signature Algorithm). In this context, the integer $Z_0$ or $N_0$ is a secret that should not be revealed by an attacker.

The common algorithm used for computing $Z_0^{-1} \bmod N_0$ is the extended Euclidean algorithm which results from the Euclidean algorithm that is extended so that it not only yields the greatest common divisor of two integers $Z_0$ and $N_0$, but also integers x and y satisfying $Z_0 x + N_0 y = d$, where $d = \gcd(Z_0, N_0)$.

The extended Euclidean algorithm contains a division in an iteration loop (e.g. a while-loop) wherein the division is again typically realized by another iteration loop in which the involved integers are shifted and subtracted or added.

There are several methods to restructure the extended Euclidean algorithm to realize it on a microprocessor. Typically, all these methods or variants have one thing in common: They consist of an outer and an inner iteration loop, wherein the outer iteration loop corresponds to a loop exchanging integer pairs and the inner loop corresponds to the implementation of the division. Routines of this kind are susceptible to SPA (SPA=Simple Power Analysis) attacks since the current or power consumption and, additionally, the time consumption depend on the numbers to be processed. An attacker could thus draw conclusions as to the numbers processed from the current or time profile and thus for example spy out a secret key of a public-key crypto algorithm as e.g. the input $Z_0$.

Hence, it is desirable to implement the division within the outer iteration loop more securely.

SUMMARY OF THE INVENTION

Embodiments of the present invention provide a device for determining an inverse of an initial value related to a modulus comprising a unit for processing an iterative algorithm in a plurality of iterations, wherein an iteration includes two modular reductions and has, as an iteration loop result, values obtained by an iteration loop of the extended Euclidean algorithm.

Further, embodiments of the present invention provide a device for determining an inverse of an initial value related to a modulus comprising a unit for processing an iterative algorithm in a plurality of iterations, the unit being adapted for performing, within an iteration, the following steps: determining a preliminary first iteration result value based on the first iteration result value of a preceding iteration or an initial first iteration result value of a first iteration and a modular reduction with respect to a modulus determined using an iteration modulus of a preceding iteration or the initial value in case of a first iteration loop, a second iteration result value of the preceding iteration or an initial second iteration result value of a first iteration and an enlargement parameter, performing a modular reduction of an iteration value with respect to the iteration modulus resulting in an updated iteration value, and extracting a first iteration result value from the preliminary first iteration result value using the updated iteration value.

BRIEF DESCRIPTION OF THE DRAWINGS

Preferred embodiments of the present invention will be described in detail referring to the accompanying drawings, in which.

DETAILED DESCRIPTION OF THE INVENTION

Figure 1A:
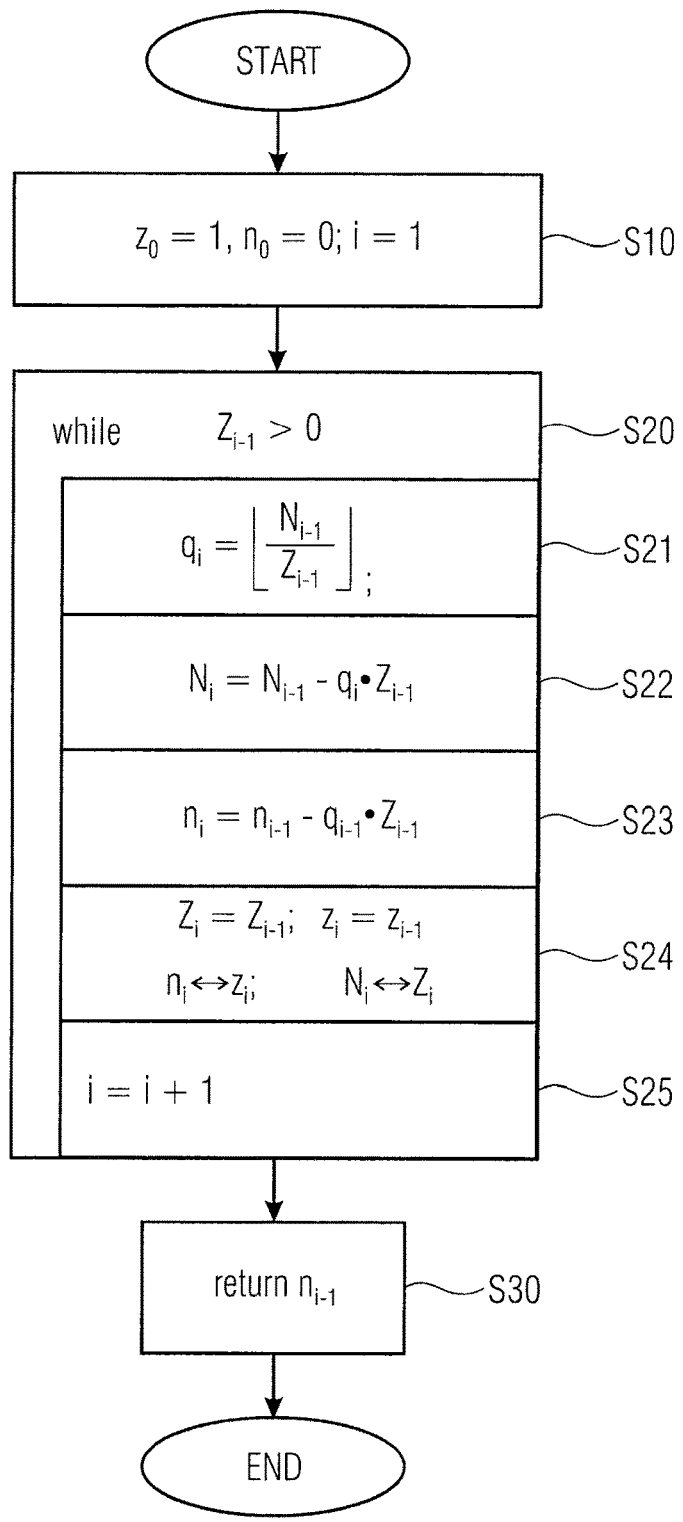
FIGS. 1a and 1b show flow charts of the extended Euclidean algorithm.

FIG. 1a shows a flow chart of the conventional extended Euclidean algorithm.

Inputs into the extended Euclidean algorithm are two non-negative integers $N_0$, $Z_0$ with $\gcd(Z_0, N_0)=1$. The output of the extended Euclidean algorithm is then the modular multiplicative inverse $Z_0 \bmod N_0$.

In a first step S10, initial first and second iteration result values $n_0$, $z_0$ are determined, respectively. The initial first iteration result value $n_0$ is set to 0. The initial second iteration result value $z_0$ is set to 1 in step S10, as well as the iteration counter i.

In a second step S20 of the extended Euclidean algorithm, an iteration loop is executed as long as an iteration loop requirement, i.e. an iteration modulus $Z_{i-1}$ is greater than 0, is fulfilled. Thereby, the iteration modulus $Z_{i-1}$ corresponds to the iteration modulus determined in the preceding iteration to the i-th iteration or the initial value $Z_0$ in case of the first iteration, i.e. i=1.

Within the i-th iteration of the iteration loop S20 an integer result $$q_i = \left\lfloor \frac{N_{i-1}}{Z_{i-1}} \right\rfloor \quad (1)$$

of a division of a numerator $N_{i-1}$ by a denominator in form of the iteration modulus $Z_{i-1}$ is computed in step S21. In a next iteration step S22 within the i-th iteration, a value $N_i$ is computed according to $$N_i = N_{i-1} - q_i Z_{i-1}, \quad (2)$$

wherein $N_i$ corresponds to the remainder of the integer division according to equation (1) and shall be denoted as iteration value in the following. $N_{i-1}$ shall be denoted as iteration value of the preceding, i.e. the (i−1)-th iteration. $N_i$ could also be computed according to $$N_i = N_{i-1} \bmod Z_{i-1}, \quad (3)$$

In a further iteration step S23 of the extended Euclidean algorithm a first iteration result value $n_i$ is determined according to $$n_i = n_{i-1} - q_i \cdot Z_{i-1}, \quad (4)$$

wherein $n_{i-1}$ denotes the first iteration result value of the preceding iteration or the initial first iteration result value $n_0$ in case i=1.

In a next iteration step S24, the iteration modulus $Z_i$ of the current, i.e. i-th, iteration is set to the iteration modulus $Z_{i-1}$ of the preceding, i.e. (i−1)-th, iteration. Likewise the second iteration result value $z_i$ of the current iteration is set to the second iteration result value of the preceding, i.e. (i−1)-th, iteration. Further, the first iteration result value $n_i$ of the i-th iteration is exchanged or swapped with the second iteration result value $z_i$ of the current iteration such that $z_i$ becomes $n_i$ and $n_i$ becomes $z_i$. Further, the i-th iteration value $N_i$ is exchanged or swapped with the i-th iteration modulus $Z_i$ such that $Z_i$ becomes $N_i$ and $N_i$ becomes $Z_i$. For swapping two values, an auxiliary register is typically required for temporarily storing one of the two values to be swapped.

In a next step S25 the iteration counter i is incremented by one.

As long as the iteration loop requirement, i.e. $Z_{i-1} > 0$, is fulfilled, the iteration loop S20 is performed. If the iteration loop requirement does not hold, i.e. $Z_{i-1} \le 0$, the iteration loop S20 is left and the first iteration result value $n_{i-1}$ of the last executed iteration which contains the desired multiplicative inverse $Z_0^{-1} \bmod N_0$ is returned in step S30 of the extended Euclidean algorithm depicted in FIG. 1a.

Figure 1B:
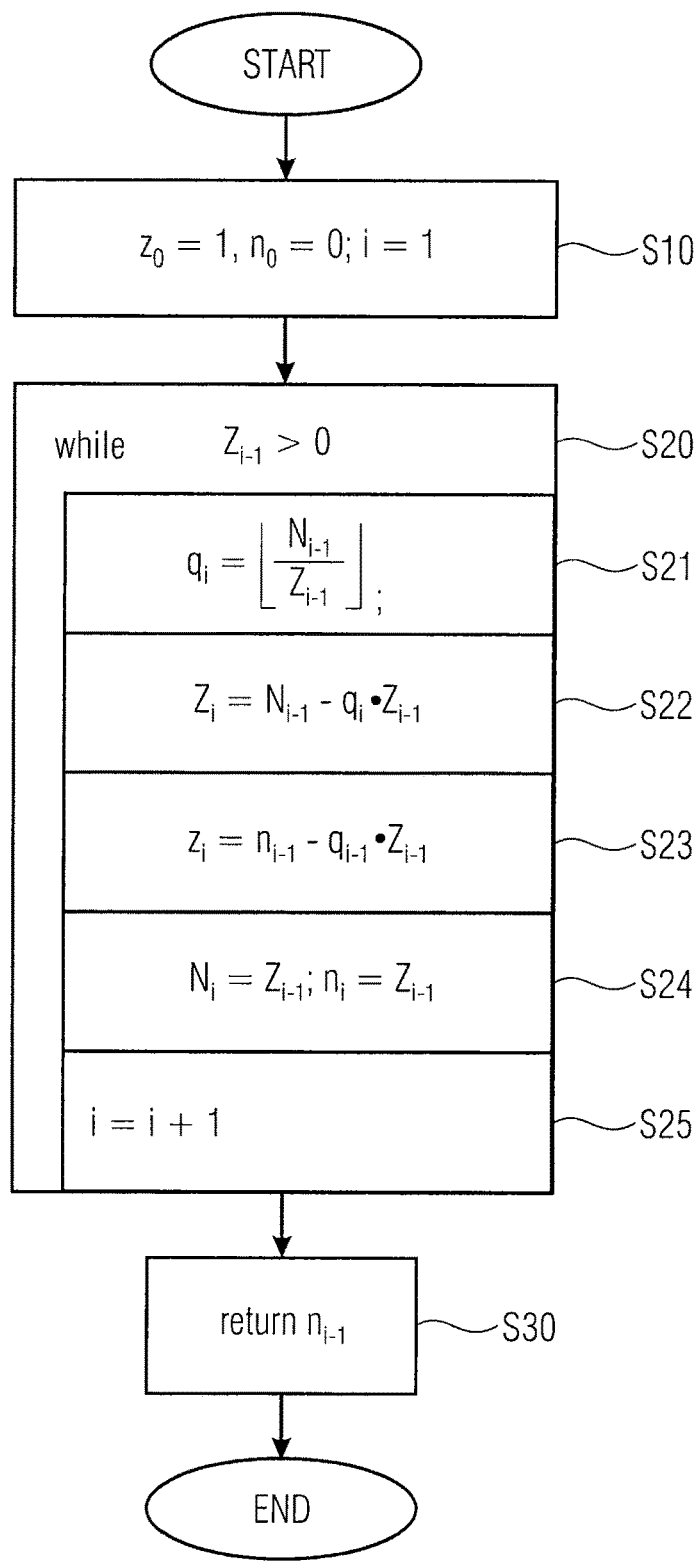

For a person skilled in the art it is obvious that the indexing depicted in FIG. 1a could also look different. Furthermore, the swapping of the register contents in step S24 can be omitted if the method is performed as depicted in FIG. 1b. The results are, of course, identical, respectively.

As can be seen, the extended Euclidean algorithm contains an integer division in iteration step S21 of the iteration loop S20. Typically, this integer division is again realized by a loop in which the involved numbers or respective register contents (here: $N_{i-1}$, $Z_{i-1}$) get shifted and subtracted or added. It can be seen from iteration step S23, that the multiplicative inverse $Z_0^{-1} \bmod N_0$ is iteratively determined in $n_i$ using the integer result $q_i$. With e.g. a simple power analysis (SPA) an attacker might be able to find out the secret initial value $Z_0$ by running the complete computation in reverse.

By trying to securely implement the division step S21, it might be possible to hide the exact value of the integer result $q_i$. This can be achieved by designing decisions during program or algorithm execution such that it is not possible to find out which program path is currently taken. However, by doing this, there might still be enough side channel information to expose valuable information to an attacker.

Embodiments of the present invention solve this problem by replacing the integer division using a modular reduction being available for almost every cryptographic coprocessor. That is, a modular reduction takes the role of the division in embodiments of the present invention. Hence, the integer result $q_i$ does not appear directly.

Figure 2:
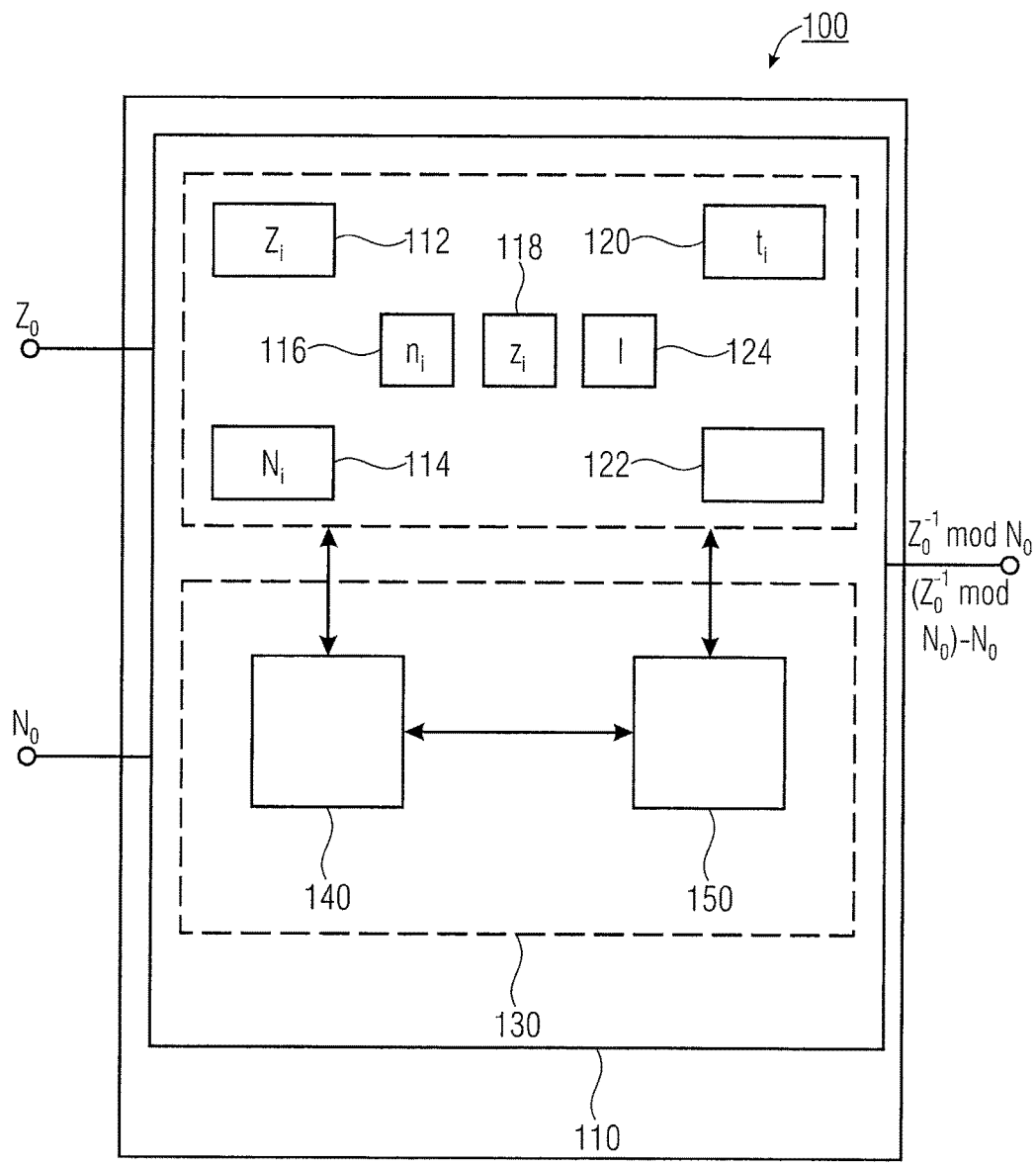
FIG. 2 shows a block diagram of a device for determining an inverse according to an embodiment of the present invention.

FIG. 2 shows a device 100 for determining an inverse of the initial value $Z_0$ related to the initial modulus $N_0$ according to an embodiment of the present invention.

The device 100 comprises a unit 110 for processing an iterative algorithm in a plurality of iterations, wherein an iteration includes two modular reductions and has, as an iteration loop result, values obtained by a loop of the extended Euclidean algorithm.

According to embodiments of the present invention, the unit 110 is adapted for performing an iterative algorithm and comprises a first register 112 for the initial value $Z_0$ being also used for an iteration modulus value $Z_i$. Further, the unit 110 comprises a second register 114 for the initial modulus $N_0$ also being used for an iteration value $N_i$. The unit 110 also comprises a third register 116 for an initial first iteration result value $n_0$ also being used for a first iteration result value $n_i$ and a preliminary first iteration result value $n_i'$. A fourth register 118 is comprised for an initial second iteration result value $z_0$ being also used for an second iteration result value $z_i$. Further, the unit 110 comprises a fifth register 120 for an enlargement parameter $t_i$, a sixth auxiliary register 122 for a swapping operation, and a processing sub-unit 130 for accessing the registers to retrieve register contents when processing the iterative algorithm in the plurality of iterations.

In a further embodiment, the unit 110 comprises a seventh register 124 for storing a bit length l of the initial modulus $N_0$.

Figure 3A:
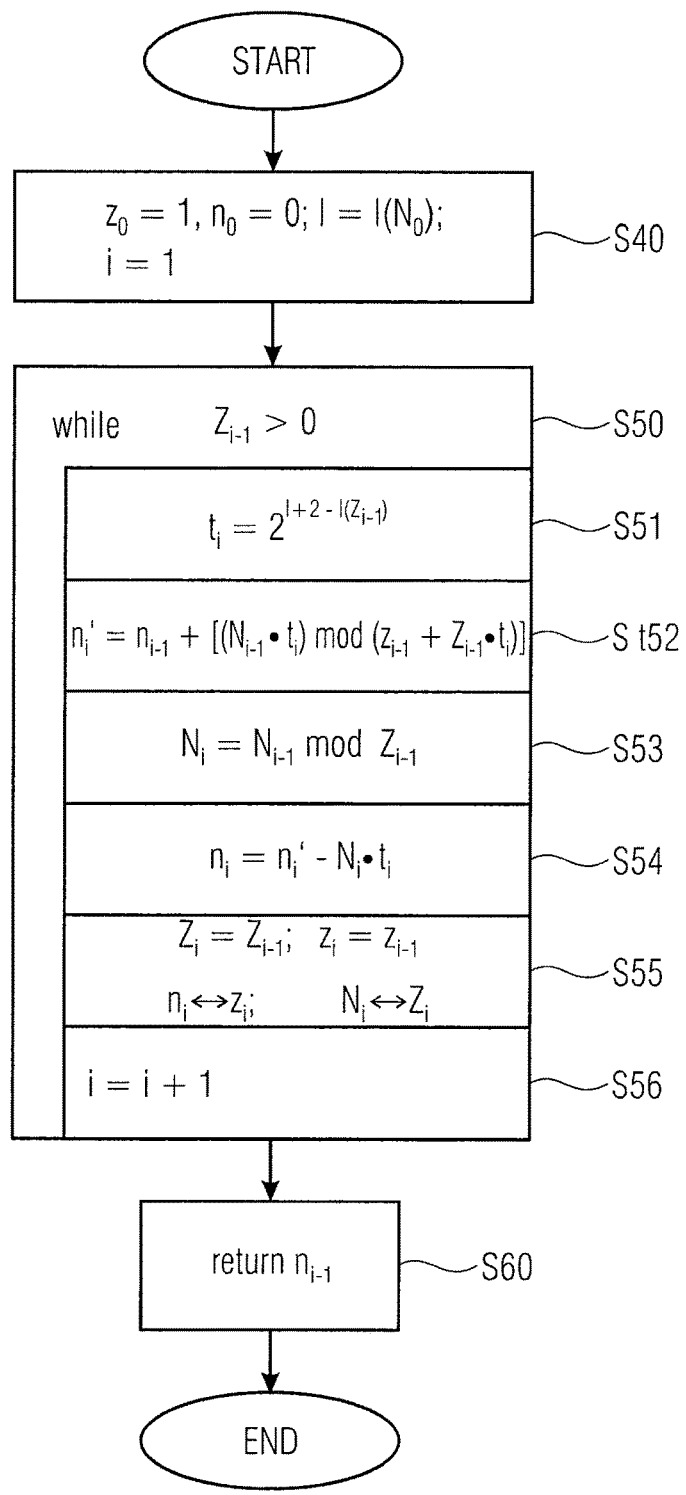
FIGS. 3a and 3b show flow charts of an algorithm for determining an inverse according to embodiments of the present invention.

An embodiment of the iterative algorithm shall be described in further detail referring to FIG. 3a.

According to an embodiment of the present invention, the unit 110 is adapted for setting initial values for a first $n_0$ and second iteration result value $z_0$, and for setting a bit length l equating the bit length of the initial modulus $N_0$ in a first step S40 before an iteration loop, i.e. $n_0=0$, $z_0=1$ and $l=l(N_0)$. The iteration counter i is set to one.

In a next step S50, the plurality of iterations is performed as long as an iteration loop requirement is fulfilled. As for the extended Euclidean algorithm having been explained referring to FIG. 1, the plurality of iterations are executed as long as an iteration modulus $Z_{i-1}$ is larger than 0. Step S50 comprises iteration steps of the i-th iteration loop, with i being an integer greater than or equal 1.

The unit 110 is, according to an embodiment of the present invention, adapted for determining an enlargement parameter $t_i$ in a step S51. Thereby, the enlargement parameter $t_i$ depends on a bit length of the iteration modulus $Z_{i-1}$ of the preceding iteration and on the bit length of the initial modulus $N_0$. According to an embodiment of the present invention, the enlargement factor $t_i$ is determined according to $$t_i \ge 2^{l+2-l(Z_{i-1})}, \quad (5)$$

wherein l denotes the bit length of the initial modulus $N_0$ and $l(Z_{i-1})$ denotes the bit length of the iteration modulus $Z_{i-1}$ of the preceding iteration (i−1). In equation (5) the number 2 is the base since exemplarily only a binary number system is considered here, while the enlargement parameter $t_i$ results when the base 2 is raised to the power of an exponent e. In general, the enlargement parameter $t_i$ has to fulfill the following condition:

$$t_i > (q_i+1)|z_{i-1}| \quad (6)$$

The reason for the inequality (6) will become evident further below.

It is preferred to rather select the enlargement parameter to be small since the enlargement parameter determines the length of the registers required for calculating the division result. If the enlargement parameter was selected to be very large, very long registers would be required, while shorter registers are sufficient when the enlargement parameter $t_i$ is selected to be smaller. Equation (5) indicates the preferred dimensioning of the exponent e for the binary case, i.e. $e=1+2-l(Z_{i-1})$.

In a further iteration step S52, the unit 110 determines a preliminary first iteration result value $n_i'$ based on the first iteration result value $n_{i-1}$ of a preceding iteration or the initial first iteration value $n_0$ in case of the first iteration and a modular reduction with respect to a modulus determined using the iteration modulus $Z_{i-1}$ of a preceding iteration or the initial value $Z_0$ in the case of the first iteration, and the second iteration result value $z_{i-1}$ of the preceding iteration or the initial second iteration result value $z_0$ in case of the first iteration, and the enlargement parameter $t_i$. In particular, the unit 110 determines the preliminary first iteration result value $n_i'$ in step S52 based on the following equation $$n_i' = n_{i-1} + [(N_{i-1} \cdot t_i) \bmod (z_{i-1} + Z_{i-1} \cdot t_i)], \quad (7)$$

wherein $n_i'$ denotes the preliminary first iteration result value, $n_{i-1}$ denotes the first iteration result value of the preceding iteration or the initial first iteration result value $n_0$ for i=1, $N_{i-1}$ denotes the iteration value of the preceding iteration or the initial modulus $N_0$ for i=1, $z_{i-1}$ denotes the second iteration result value of the preceding iteration or the initial second iteration result value $z_0$ for i=1, $Z_{i-1}$ denotes the iteration modulus of the preceding iteration or the initial value $Z_0$ in case of the first iteration (i=1) and $t_i$ denotes the enlargement parameter of the i-th iteration.

A multiplication with the enlargement parameter $t_i$ can be efficiently realized by a shift operation to shift the respective register contents for $N_{i-1}$ or $Z_{i-1}$ to more significant bit positions, wherein the number of shifted bit positions corresponds to the exponent $e=1+2-l(Z_{i-1})$ of the base 2. Hence, the enlargement parameter $t_i$ can be regarded as a modulus shift value and $(Z_{i-1} t_i)$ can be regarded as an enlarged modulus.

The modulus shift value is, according to embodiments, determined by the processing sub-unit or the controller 130, wherein the controller 130 comprises a first processing sub-unit 140, e.g. a general purpose microprocessor, for processing numbers having a first bit length, e.g. 64 bits. Further, the unit 110 comprises a second processing sub-unit 150, e.g. a cryptographic coprocessor, for processing numbers having a second wordlength, e.g. 1024 bits, the second wordlength being greater than the first bit length. Further, the controller 130 is configured to shift the content of the modulus register 112 to more significant bit positions by a number of register bit-positions e.g. corresponding to the exponent $e=1+2-l(Z_{i-1})$ to obtain a shifted content.

In a next iteration step S53, a modular reduction of the iteration value $N_{i-1}$ of the preceding iteration with respect to the iteration modulus $Z_{i-1}$ of the preceding iteration is performed according to $$N_i = N_{i-1} \bmod Z_{i-1} \quad (8)$$

resulting in an updated iteration value $N_i$.

In yet a further iteration step S54, the first iteration result value $n_i$ is extracted from the preliminary first iteration result value $n_i'$ using the iteration value $N_i$ according to $$n_i = n_i' - N_i \cdot t_i. \quad (9)$$

In a last iteration step S55 of an embodiment of the present invention, the iteration modulus $Z_i$ of the current, i.e. i-th, iteration is set to the iteration modulus $Z_{i-1}$ of the preceding, i.e. (i−1)-th, iteration. Likewise the second iteration result value $z_i$ of the current iteration is set to the second iteration result value $z_{i-1}$ of the preceding, i.e. (i−1)-th, iteration. Further, values between the first and second iteration result values $n_i$, $z_i$ and between the iteration modulus $Z_i$ and the iteration value $N_i$ are swapped or exchanged such that $z_i$ becomes $n_i$ and $n_i$ becomes $z_i$ and such that $Z_i$ becomes $N_i$ and $N_i$ becomes $Z_i$.

In other words, the contents of the register 116 of the device 100 for the first iteration result value $n_i$ or the initial first iteration result value $n_0$ in case of a first iteration and the register 118 of the device 100 for the second iteration result value $z_i$, the second iteration result value of the preceding iteration $z_{i-1}$ or the initial second iteration result value $z_0$ in case of a first iteration are swapped. Further, the contents of the register 112 of the device 100 for the iteration modulus $Z_i$, the iteration modulus of the preceding iteration $Z_{i-1}$ or the initial value $Z_0$ in case of a first iteration and the register 114 of the device 100 for the updated iteration value $N_i$, the iteration value of the preceding iteration $N_{i-1}$ or the initial modulus $N_0$ in case of a first iteration are swapped.

In further embodiments of the present invention the step S55 of swapping can also be performed at the beginning of each iteration by swapping register contents for the first iteration result value and the second iteration result value of the preceding iteration and by swapping register contents for the iteration modulus and the iteration value of the preceding iteration, or the respective initial values in case of a first iteration.

In a next step S56 the iteration counter i is incremented by one.

Before the next iteration of the iteration loop S50, the iteration requirement is checked, i.e. it is checked whether the iteration modulus $Z_{i-1}$ of the preceding iteration is greater than 0.

If this is the case, the next iteration is executed. If the iteration requirement is not fulfilled, then the first iteration result value $n_{i-1}$ of the last executed iteration is returned in a step S60 containing $Z_0^{-1} \bmod N_0$ or $(Z_0^{-1} \bmod N_0) - N_0$.

Figure 3B:
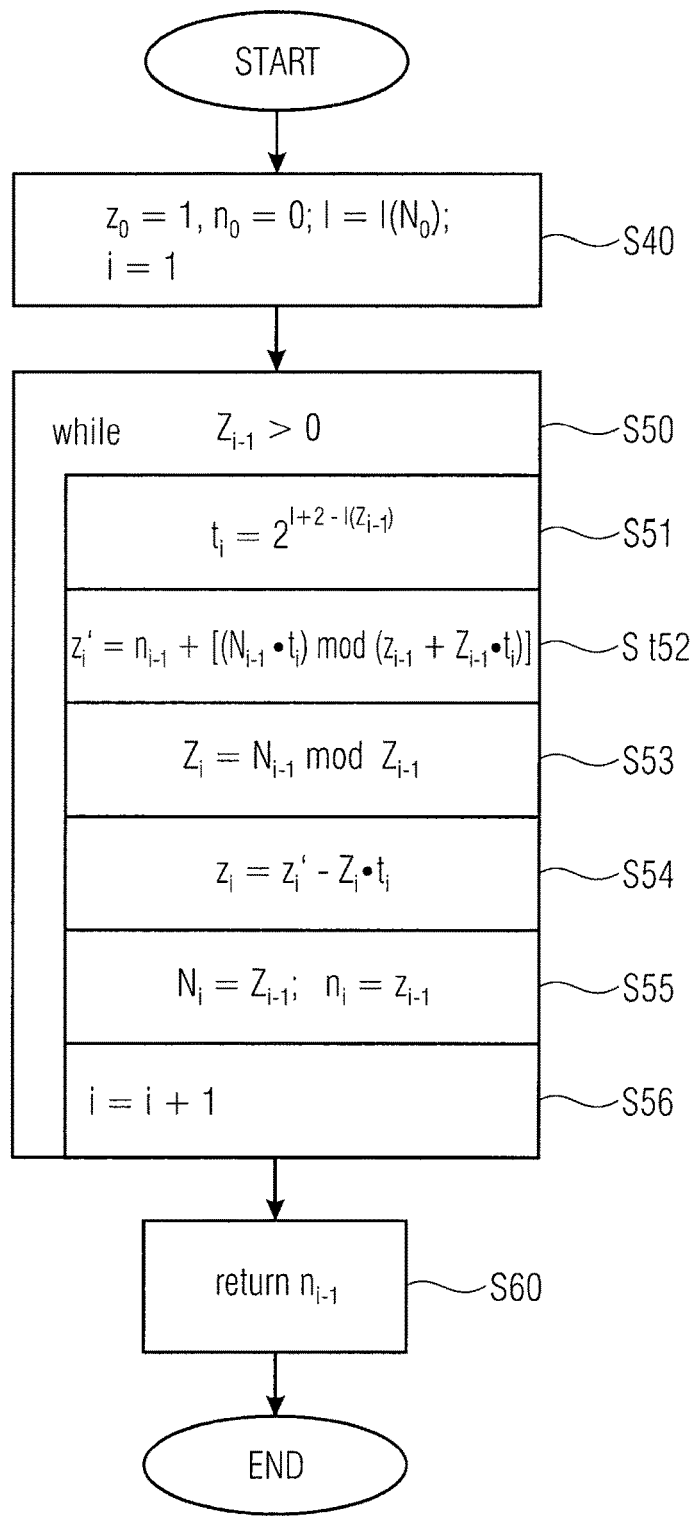

Further, the swapping operation in step S55 could also be omitted by simple algorithmic modifications. If, e.g., $n_i$ was replaced by $z_i'$ in step S52, $N_i$ was replaced by $Z_i$ in step S53, $n_i$, $n_i'$ and $N_i$ were replaced by $z_i$, $z_i'$ and $Z_i$, respectively, in step S54, and $Z_i = Z_{i-1}$, $z_i = z_{i-1}$ were replaced by $N_i = N_{i-1}$, $n_i = n_{i-1}$ respectively, in step S55, the swapping operation in step S55 could be omitted as depicted in FIG. 3b.

For a person skilled in the art it is further obvious that the indexing depicted in FIG. 3a could also look different.

The cryptographic coprocessor 150 is adapted to perform the modular reduction according to equation (7) and/or (8). According to embodiments of the present invention in the modular reduction algorithm a modular reduction is performed on a target value by subtracting an enlarged modulus. For that, not necessarily in the cryptographic coprocessor 150, a modulus shift value is determined and a modulus is enlarged using the modulus shift value to obtain the enlarged modulus. The enlarged modulus is then subtracted from the target value.

The general purpose microprocessor 140 performs an iteration control of the iterative algorithm or the iteration-loop S50 according to embodiments of the present invention.

In the following the inventive algorithm depicted in the flow chart of FIG. 3a shall be described in more detail, and compared to the extended Euclidean algorithm depicted in the flow chart of FIG. 1a.

Using equation (2) of step S22 of the extended Euclidean algorithm, equation (1) of step S21 can be transformed as follows:

$$N_{i-1}=q_i \cdot Z_{i-1}+N_i, \quad (10)$$

wherein the value $N_i$ is greater than or equal to 0 and smaller than $Z_{i-1}$. When equation (10) is multiplied by the enlargement parameter $t_i$, the following equation results:

$$N_{i-1} \cdot t_i = q_i Z_{i-1} \cdot t_i + N_i \cdot t_i. \quad (11)$$

When additionally equation (3) is also multiplied by the enlargement parameter $t_i$ on both sides, the following equation results:

$$N_i \cdot t_i = N_{i-1} \cdot t_i \bmod(Z_{i-1} \cdot t_i). \quad (12)$$

In addition, the following applies:

$$0 \le N_i \cdot t_i < Z_{i-1} \cdot t_i. \quad (13)$$

The $z_{i-1}$-fold integer result $q_i$ is then added to (or subtracted from), and simultaneously subtracted from (or added to) the right side of equation (11), which corresponds to the following equation:

$$N_{i-1} \cdot t_i = q_i Z_{i-1} \cdot t_i + z_{i-1} q_i + N_i \cdot t_i - z_{i-1} q_i. \quad (14)$$

When equation (14) is transformed, such that the result $q_i$ of the first two terms on the right hand side of equation (14) is factored out, the following expression results:

$$N_{i-1} t_i = q_1(Z_{i-1} \cdot t_i + z_{i-1}) + N_i \cdot t_i - z_{i-1} q_i. \quad (15)$$

Equation (15) can be transformed to $$N_i \cdot t_i - z_{i-1} q_i = N_{i-1} \cdot t_i - q_i(Z_{i-1} \cdot t_i + z_{i-1}) \quad (16)$$

When equation (16) is then compared to equations (10) and (2), it becomes evident that equation (16) is a new determination equation for a new division, wherein the difference for the sum of the left side of equation (16), i.e. the auxiliary quantity $(N_i t_i - z_{i-1} q_i)$ in which the result $q_i$ sought for is contained, corresponds to the remainder of an integer division of a numerator $N_{i-1} t_i$ by a denominator $(Z_{i-1} t_i + z_{i-1})$. The remainder of this division, i.e. the auxiliary quantity on the left side of equation (16) can be calculated by the following equation in analogy to equation (3):

$$N_i \cdot t_i - z_{i-1} q_i = (N_{i-1} t_i) \bmod(Z_{i-1} \cdot t_i + z_{i-1}) \quad (17)$$

When equation (17) with the difference on the left side is inserted into equation (7), the following results:

$$n_i' = n_{i-1} + N_i \cdot t_i - z_{i-1} q_i. \quad (18)$$

When equation (18) is then inserted into equation (9) the following equation results:

$$n_i' = n_{i-1} - z_{i-1} q_i. \quad (19)$$

Hence, equation (19) corresponds to equation (4) of step S23 of the extended Euclidean algorithm to determine the multiplicative inverse $Z_0^{-1} \bmod N_0$.

Looking at equation (17) and coming back to the inequality (6) it becomes obvious to those skilled in the art why the enlargement parameter $t_i$ should be, in any case, greater than $(q_i+1)|z_{i-1}|$. This is to ensure that the left-hand side of equation (17) does not become negative at any time. In particular, the enlargement parameter $t_i$ has to be big enough, such that the left-hand side lies between zero and the modulus of the right-hand side of equation (17).

According to embodiments of the present invention the device 100 is hence configured as a side-channel-attack-secure-reduction hardware block and is at least part of a key generator for keys used in cryptographic applications. The device 100 is thereby adapted for generating e.g. a private key for an asymmetric cryptographic scheme, the cryptographic scheme comprising a key pair of the private key and a corresponding public key. The private key is kept secret, while the public key may be widely distributed. The keys are related mathematically, but the private key cannot be practically derived from the public key. A message encrypted with the public key can be decrypted only with the corresponding private key. For that the device 100 outputs a value (the modular multiplicative inverse) determined in a last iteration of a plurality of iterations as at least a part of the private key.

Hence, the present invention, due to its flexibility, safety and performance, is suitable in particular for cryptographic algorithms and for cryptographic coprocessors on which a safe and efficient implementation of the modular reduction is typically implemented by means of a circuit, in particular for cryptographic key-generation.

Depending on the circumstances, the inventive method may be implemented in hardware or in software. The implementation may be done on a digital storage medium, particularly a disk or a CD with electronically readable control signals, which may cooperate with a programmable computer system so that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A side-channel-attack-hardened-modular reduction device for determining an inverse of an initial value related to a modulus, comprising:
a processor configured to randomize its power or time consumption patterns as a defense to side-channel attacks while processing an iterative algorithm in a plurality of iterations, wherein the iterative algorithm comprises an iteration loop, the iteration loop comprising the plurality of iterations and an iteration loop requirement, wherein an iteration of the plurality of iterations includes two modular reductions and has, as an iteration result, values obtained by an iteration of an extended Euclidean algorithm, wherein an integer result of an integer division does not appear directly in any iteration of the plurality of iterations,
wherein the processor comprises a controller configured to perform the iteration loop as long as the iteration result of a last executed iteration of the plurality of iterations fulfills the iteration loop requirement, wherein the iteration loop is left, when the iteration result of the last executed iteration of the plurality of iterations does not fulfill the iteration loop requirement, and wherein the iteration result of the last executed iteration is returned to obtain or to determine the inverse of the initial value related to the modulus,
wherein the controller comprises:
a microprocessor configured to process numbers having a first wordlength; and
a cryptographic coprocessor configured to process numbers having a second wordlength, the second wordlength being greater than the first wordlength, and wherein the cryptographic coprocessor is configured to perform the modular reductions included in the iteration of the plurality of iterations.

2. The side-channel-attack-hardened-modular-reduction device according to claim 1, wherein the cryptographic coprocessor is configured to perform a modular reduction algorithm in which a modular reduction is performed on a target value by subtracting an enlarged modulus, and is further configured to:
  determine a modulus shift value;
  enlarge a modulus using the modulus shift value to obtain the enlarged modulus; and
  subtract the enlarged modulus from the target value.

3. The side-channel-attack-hardened-modular-reduction device according to claim 2, wherein the processor comprises:
  a modulus register configured to store the modulus; and
  a target value register configured to store the target value,
  wherein the controller is configured to:
    determine the modulus shift value,
    shift a content of the modulus register to more significant bit positions by a number of register bit-positions to obtain a shifted content, the number of register bit-positions being determined by the shift value, and
    combine the shifted register content of the modulus register and a content of the target value register.

4. The side-channel-attack-hardened-modular-reduction device according to claim 1, wherein the side-channel-attack-secure-reduction device is a key generator for keys used in cryptographic applications.

5. The side-channel-attack-hardened-modular-reduction device according to claim 4, which is configured to generate the at least the part of the key as a private key for an asymmetric cryptographic scheme, the cryptographic scheme comprising a key pair of the private key and a corresponding public key.

6. The side-channel-attack-hardened-modular-reduction device according to claim 5, which is configured to output a value determined in a last iteration of a plurality of iterations as the at least a part of the private key.

7. A side-channel-attack-hardened-modular-reduction device for determining an inverse of an initial value related to an initial modulus, comprising:
  a processor configured to randomize its power or time consumption patterns as a defense to side-channel attacks while processing an iterative algorithm in a plurality of iterations, wherein the iterative algorithm comprises an iteration loop, the iteration loop comprising a plurality of iterations and an iteration loop requirement, the processor being configured, within an iteration, to:
    determine a preliminary first iteration result value based on a first iteration result value of a preceding iteration or an initial first iteration result value in case of a first iteration and a modular reduction with respect to a modulus determined using an iteration modulus of the preceding iteration or the initial value in case of a first iteration, a second iteration result value or an initial second iteration result value in case of a first iteration and an enlargement parameter;
    perform a modular reduction of an iteration value of the preceding iteration or the initial modulus in case of a first iteration with respect to the iteration modulus of the preceding iteration resulting in an updated iteration value;
    extract a first iteration result value from the preliminary first iteration result value using the updated iteration value,
  wherein an integer result of an integer division does not appear directly in any iteration of the plurality of iterations,
  wherein the processor comprises a controller configured to perform the iteration loop as long as the iteration result of a last executed iteration of the plurality of iterations fulfills the iteration loop requirement, wherein the iteration loop is left, when the iteration result of a last executed iteration of the plurality of iterations does not fulfill the iteration loop requirement, and wherein the iteration result of the last executed iteration is returned to obtain or to determine the inverse of the initial value.

8. The side-channel-attack-hardened-modular reduction device according to claim 7, further comprising:
  a first hardware register configured to store the first iteration result value, the first iteration result value of the preceding iteration or the initial first iteration result value in case of a first iteration;
  a second hardware register configured to store the second iteration result value, the second iteration result value of the preceding iteration or the initial second iteration result value in case of a first iteration;
  a third hardware register configured to store the iteration modulus, the iteration modulus of the preceding iteration or the initial value in case of a first iteration; and
  a fourth hardware register configured to store the updated iteration value, the iteration value of the preceding iteration or the initial modulus in case of a first iteration,
  wherein the processor is configured to swap contents of the first and second register and swap contents of the third and fourth hardware register within an iteration to enable access to the same four registers during each of the plurality of iterations for a processing sub-unit.

9. The side-channel-attack-hardened-modular-reduction device according to claim 8, wherein the processor is configured to perform the swapping after extracting a first iteration result value, between the first iteration result value and the second iteration result value of the preceding iteration, and between the iteration modulus of the preceding iteration and the updated iteration value.

10. The side-channel-attack-hardened-modular-reduction device according to claim 8, wherein the processor is configured to perform the swapping at the beginning of each iteration by swapping values between the first and the second iteration result values of the preceding iteration and swapping values between the iteration modulus and the updated iteration value of the preceding iteration or the respective initial values in case of a first iteration.

11. The side-channel-attack-hardened-modular-reduction device according to claim 7, wherein the processor is configured to further perform, within an iteration, the following before the determining the preliminary first iteration result value:
  determining the enlargement parameter depending on a bit length of the iteration modulus of the preceding iteration and on a bit length of the initial modulus.

12. The side-channel-attack-hardened-modular-reduction device according to claim 11, wherein the enlargement parameter is determined satisfying the following equation:

$$t_i=2^{l+2-l(Z_{i-1})}$$

wherein, l denotes the bit length of the initial modulus and $l(Z_{i-1})$ denotes the bit length of the iteration modulus of the preceding iteration.

13. The side-channel-attack-hardened-modular-reduction device according to claim 7, wherein the processor is configured to further perform, within an iteration, the following before the determining the preliminary first iteration result value:

determining the enlargement parameter according to $$t_i>(q_i+1)|z_{i-1}|,$$

wherein $q_i$ denotes an integer result of a division of the iteration value of the preceding iteration or the initial modulus in case of a first iteration and the iteration modulus of the preceding iteration, and $z_{i-1}$ denotes the second iteration result value of the preceding iteration or the initial second iteration result value in case of a first iteration.

14. The side-channel-attack-hardened-modular-reduction device according to claim 7, wherein the determining the preliminary first iteration result value is based on the following equation:

$$n_i'=n_{i-1}+[(N_{i-1}\cdot t_i)\mathrm{mod}(z_{i-1}+Z_{i-1}\cdot t_i)],$$

wherein $n_i'$ denotes the preliminary first iteration result value, $n_{i-1}$ denotes the first iteration result value of the preceding iteration or the initial first iteration result value in case of a first iteration, $N_{i-1}$ denotes the iteration value of the preceding iteration or the initial modulus in case of a first iteration, $z_{i-1}$ denotes the second iteration result value of the preceding iteration or the initial second iteration result value in case of the first iteration, $Z_{i-1}$ denotes the iteration modulus of the preceding iteration or the initial value in case of the first iteration and $t_i$ denotes the enlargement parameter.

15. The side-channel-attack-hardened-modular-reduction device according to claim 7, wherein the performing a modular reduction of an iteration value is based on the following equation:

$$N_i=N_{i-1}\mathrm{mod}Z_{i-1},$$

wherein $N_i$ denotes the updated iteration value, $N_{i-1}$ denotes the iteration value of the preceding iteration or the initial modulus in the case of the first iteration and $Z_{i-1}$ denotes the iteration modulus of the preceding iteration or the initial value in case of the first iteration.

16. The side-channel-attack-hardened-modular-reduction device according to claim 7, wherein the extracting is based on the following equation:

$$n_i=n_i'-N_i\cdot t_i,$$

wherein $n_i'$ corresponds to the preliminary first iteration result value, $n_i$ denotes the first iteration result value, $N_i$ denotes the updated iteration value and $t_i$ denotes the enlargement parameter.

17. A side-channel-attack-hardened-modular-reduction device for determining an inverse of an initial value related to a modulus using an iterative algorithm in a plurality of iterations, the side-channel-attack-hardened-modular-reduction device comprising:

a first hardware register configured to store the initial value, and being used for an iteration modulus;

a second hardware register configured to store the initial modulus, and being used for an iteration value;

a third hardware register configured to store an initial first iteration result value, and being used for a first iteration result value and a preliminary first iteration result value;

a fourth hardware register configured to store an initial second iteration result value, and being used for a second iteration result value;

a fifth hardware register configured to store an enlargement parameter;

a sixth hardware auxiliary register configured to swap register contents; and a processor configured to randomize its power or time consumption patterns as a defense to side-channel attacks while processing the hardware registers to retrieve register contents when processing an iterative algorithm in a plurality of iterations, wherein the iterative algorithm comprises an iteration loop, the iteration loop comprising the plurality of iterations and an iteration loop requirement, wherein an iteration of the plurality of iterations includes two modular reductions and has, as an iteration result, values obtained by an iteration of an extended Euclidean algorithm, wherein an integer result of an integer division does not appear directly in any iteration of the plurality of iterations, wherein the processor comprises a controller configured to perform the iteration loop as long as the iteration result of a last executed iteration of the plurality of iterations fulfills the iteration loop requirement, wherein the iteration loop is left, when the iteration result of a last executed iteration of the plurality of iterations does not fulfill the iteration loop requirement, and wherein the iteration result of the last executed iteration is returned to obtain or to determine the inverse of the initial value related to the modulus.

18. The side-channel-attack-hardened-modular-reduction device according to claim 17, wherein the processor is operative to access the registers to perform the following computations:

$$n_i'=n_{i-1}+[(N_{i-1}\cdot t_i)\mathrm{mod}(z_{i-1}+Z_{i-1}\cdot t_i)],$$

$$N_i=N_{i-1}\mathrm{mod}Z_{i-1},$$

$$n_i=n_i'-N_i\cdot t_i,$$

wherein $n_i$, denotes the first iteration result value, $n_{i-1}$ denotes the first iteration result value of the preceding iteration or the initial first iteration result value in case of a first iteration, $N_{i-1}$ denotes the iteration value of the preceding iteration or the initial modulus in case of a first iteration, $z_{i-1}$ denotes the second iteration result value of the preceding iteration or the initial second iteration result value in case of the first iteration, $Z_{i-1}$ denotes the iteration modulus of the preceding iteration or the initial value in case of the first iteration, $t_i$ denotes the enlargement parameter and wherein $n_i'$ corresponds to the preliminary first iteration result value.

19. A method of a side-channel-attack-hardened-modular-reduction device for determining an inverse of an initial value related to a modulus, comprising:

randomizing power or time consumption patterns as a defense to side-channel attacks while processing, by a processor of the side-channel-attack-hardened-modular-reduction device, an iterative algorithm in a plurality of iterations, wherein the iterative algorithm comprises an iteration loop, the iteration loop comprising the plurality of iterations and an iteration loop requirement, wherein an iteration includes two modular reductions and has, as an iteration result, values obtained by an iteration of an extended Euclidean algorithm, wherein an integer result of an integer division does not appear directly in any iteration of the plurality of iterations, wherein the iteration loop is performed as long as the iteration result of a last executed iteration of the plurality of iterations fulfills the iteration loop requirement, wherein the iteration loop is left, when the iteration result of a last executed iteration of the plurality of iterations does not fulfill the iteration loop requirement, and wherein the iteration result of the last executed iteration is returned to obtain or to determine the inverse of the initial value, and wherein the processor comprises:
- a microprocessor configured to process numbers having a first wordlength; and
- a crypotgraphic coprocessor configured to process numbers having a second wordlength, the second wordlength being greater than the first wordlength, and configured to perform the modular reductions included in the iteration of the plurality of iterations.

20. The method according to claim 19, wherein the processing comprises:
- determining a preliminary first iteration result value based on the first iteration result value of a preceding iteration or an initial first iteration result value in case of a first iteration and a modular reduction with respect to a modulus determined using an iteration modulus of the preceding iteration or the initial value in case of a first iteration, a second iteration result value or an initial second iteration result value in case of a first iteration and an enlargement parameter;
- performing a modular reduction of an iteration value of the preceding iteration or the initial modulus in case of a first iteration with respect to the iteration modulus of the preceding iteration resulting in an updated iteration value; and
- extracting a first iteration result value from the preliminary first iteration result value using the updated iteration value.

21. A non-transitory storage medium having stored thereon a computer program comprising a program code for performing a method of a side-channel-attack-hardened-modular-reduction device for determining an inverse of an initial value related to a modulus, comprising:

randomizing its power or time consumption patterns as a defense to side-channel attacks while processing, by a processor of the side-channel-attack-hardened-modular-reduction device, an iterative algorithm in a plurality of iterations, wherein the iterative algorithm comprises an iteration loop, the iteration loop comprising the plurality of iterations and an iteration loop requirement, wherein an iteration includes two modular reductions and has, as an iteration result, values obtained by an iteration of an extended Euclidean algorithm, wherein an integer result of an integer division does not appear directly in any iteration of the plurality of iterations, wherein the iteration loop is performed as long as the iteration result of a last executed iteration of the plurality of iterations fulfills the iteration loop requirement, wherein the iteration loop is left, when the iteration result of a last executed iteration of the plurality of iterations does not fulfill the iteration loop requirement, and wherein the iteration result of the last executed iteration is returned to obtain or to determine the inverse of the initial value, and wherein the processor comprises:
- a microprocessor configured to process numbers having a first wordlength; and
- a crypotgraphic coprocessor configured to process numbers having a second wordlength, the second wordlength being greater than the first wordlength, and configured to perform the modular reductions included in the iteration of the plurality of iterations.

22. The side-channel-attack-hardened-modular-reduction device according to claim 1, wherein the inverse of the initial value related to the modulus is at least a part of a key for a cryptographic application.

23. The side-channel-attack-hardened-modular-reduction device according to claim 7, wherein the inverse of the initial value is at least a part of a key for a cryptographic application.

24. The side-channel-attack-hardened-modular-reduction device according to claim 17, wherein the inverse of the initial value related to the modulus is at least a part of a key for a cryptographic application.

25. The method according to claim 19, further comprising:
- generating, by the side-channel-attack-hardened-modular-reduction device based on the inverse of the initial value related to the modulus, the at least the part of the key for a cryptographic application.

* * * * *